Harold G. Olson
Leonard W. Johnson
Inventors
by Peter + Meyer,
Attorneys

Feb. 16, 1971  H. G. OLSON ET AL  3,562,886
METHOD OF MAKING A FRAMING MEMBER
Original Filed Aug. 16, 1967
2 Sheets-Sheet 2
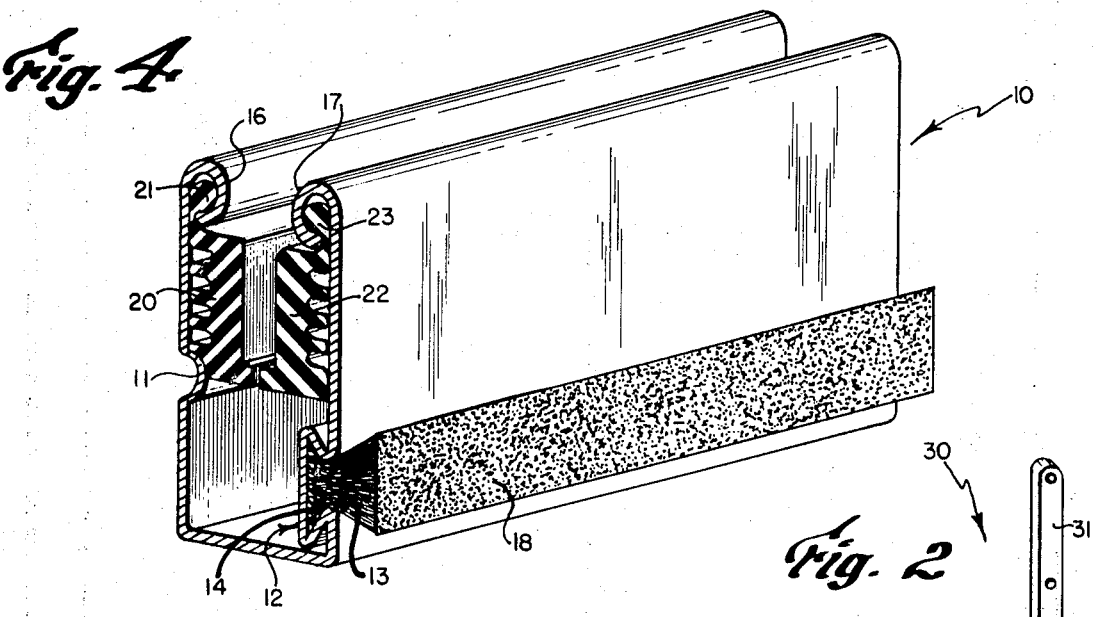
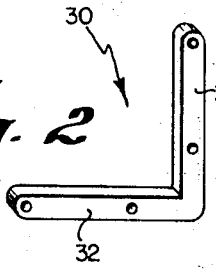
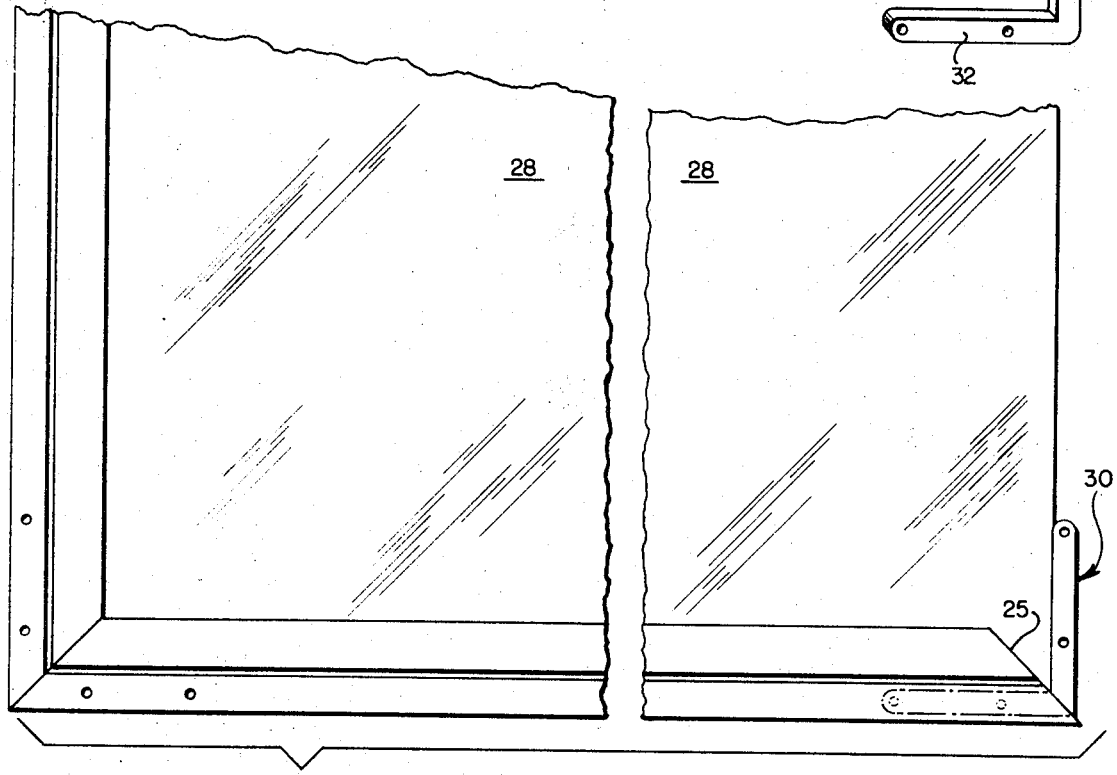
Harold G. Olson
Leonard W. Johnson
Inventors
by Porter + Meyer,
Attorneys

United States Patent Office 3,562,886
Patented Feb. 16, 1971

3,562,886
METHOD OF MAKING A FRAMING MEMBER
Harold G. Olson, Westport, Conn., and Leonard W. Johnson, Amesbury, Mass., assignors to The Bailey Company, Inc., Amesbury, Mass., a corporation of Massachusetts
Original application Aug. 16, 1967, Ser. No. 661,007. Divided and this application Jan. 17, 1969, Ser. No. 817,594
Int. Cl. B21d 39/02, 53/74
U.S. Cl. 29—155                    5 Claims

ABSTRACT OF THE DISCLOSURE

The present invention relates to window frames or sashes made to hold panes of glass or panels of other materials, such as plastic, and in particular to roll-formed framing members, in which the glass supporting gaskets and weatherstripping are assembled together with the framing members as part of the roll-forming process prior to cutting the members into useable lengths.

---

This application is a divisional of our co-pending application, Ser. No. 661,007, filed Aug. 16, 1967.

BACKGROUND OF THE INVENTION

Rolled or extruded framing members for glass panels are found primarily in aluminum windows and doors. Present practice is for window and door manufacturers to make or buy long (18 ft.) aluminum extrusions or roll formed shapes from which to make frames to hold the glass. When extrusions are used, a pile weatherstrip or other weatherstripping such as vinyl plastic, rubber, etc. is usually drawn into a T slot in the extrusion, either by hand or by machinery, through the full length. The extrusion, together with its assembled weatherstrip, is then miter cut to appropriate length for whatever window frame is required, four pieces to the frame. When roll formed shapes are used the weatherstrip is usually omitted because of the difficulty of roll forming a suitable T slot. The glass is cut to the required size and a vinyl or rubber extrusion, usually U-shaped, is slipped over all four edges of the glass by hand and cut off. Next the four pieces of framing are applied to the four edges of the glass which now are covered with the vinyl or rubber extrusion. This assembly work is accompanied by the insertion of four stamped or die cast corner reinforcements. The aluminum extrusions are fastened to the corner reinforcements usually by means of a dimpling process, but sometimes they are screwed together in order to enaple reglazing. Prior to assembly with the glass and/or the weatherstripping, the 18 ft. lengths of aluminum extrusion are sometimes anodized and/or painted.

An example of the prior art can be found in U.S. Pat. No. 2,809,728, issued Oct. 15, 1957 to H. G. Olson. In that patent it will be noticed that the compliant extrusion covering the glass edges (item 16, FIG. 2) is secured to the frame member before insertion of the glass. In order to enable ease in securing this compliant extrusion, and to provide more support for the weight of glass, it was first sheathed in a medial metal channel (item 17, FIG. 2). As will be seen, in the present invention, the inner compliant extrusion is secured directly to the outer frame member before the latter is formed into a U-shaped channel.

Thus it is an object of the present invention to define a method of making a roll formed frame member for a glass or other panel in the form of a U-shaped channel having separate strips of glass-gripping vinyl or rubber gasket material secured along each interior side of said channel.

It is a further object of the invention to define a method of making a U-shaped channel roll formed frame member for a glass or other panel in which discontinuities are roll formed along either side of said channel, one of the discontinuities consisting of a strictured recess securing a length of weatherstripping, and the other helping to constrain a corner reinforcement.

Further objects and features of the invention will be understood upon reading the following description, together with the drawings.

BRIEF DESCRIPTION OF THE DRAWINGS

In the drawings:
FIG. 2 is a die cast corner reinforcement for assembling four frame member pieces into a rectangle.
FIG. 3 is a partial front elevation of a pane of glass secured in framing members according to the invention.
FIG. 4 is a projected view of a second embodiment of a frame member according to the invention.

DESCRIPTION OF THE PREFERRED EMBODIMENT

Figure 1:
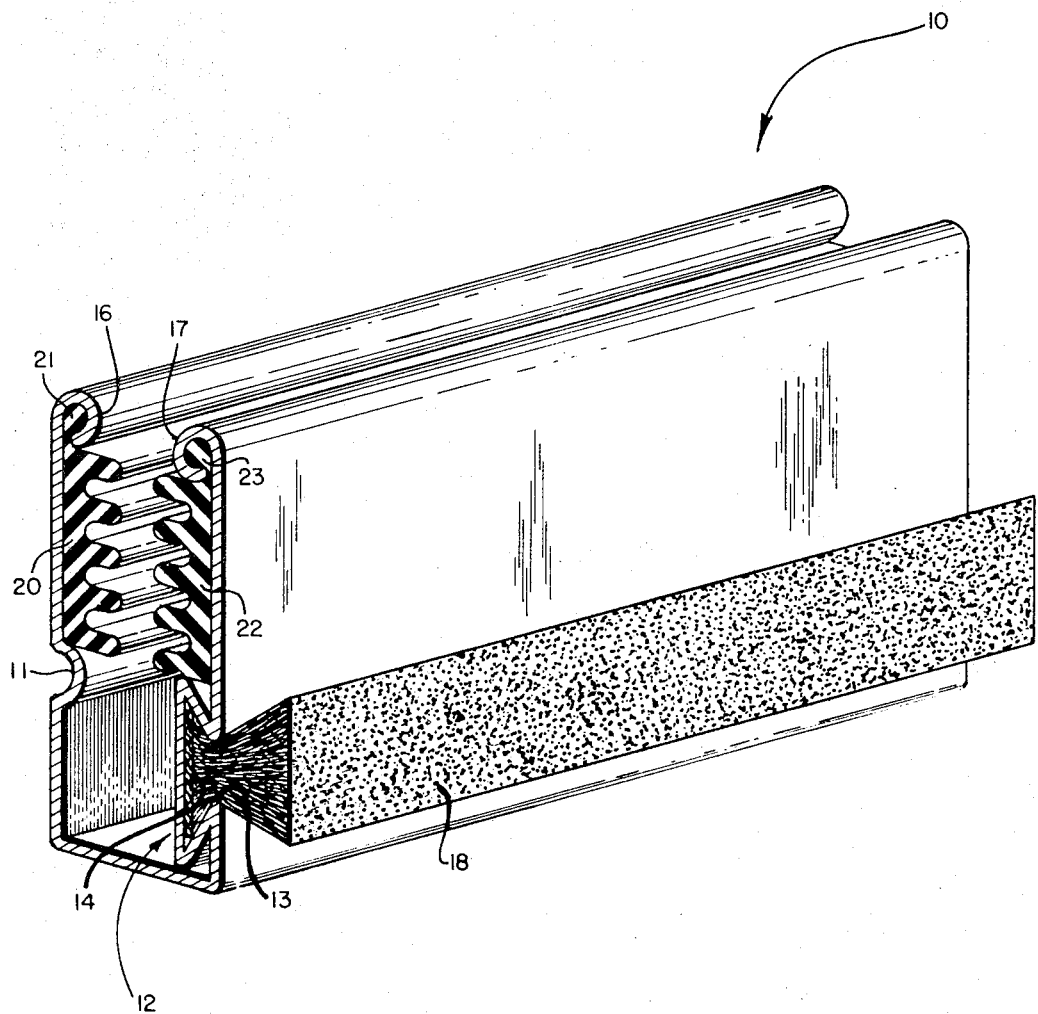
FIG. 1 is a projected view of a first embodiment of a frame member according to the invention.

Referring now to FIG. 1, the advantages of the inventive arrangement will be best understood by considering them in relation to the process of manufacture. Frame member 10 begins as a coil of flat strip of material such as aluminum galvanized steel or other metal usually about 2,000 feet long and two inches or more wide. These dimensions are not critical but are helpful in picturing the manufacturing process. This strip material is run through a roll forming machine containing a series of pairs of matching contoured rolls, each pair of which forms an increment of the final shape.

First the rolls start forming first discontinuity 12, spaced to one side of center along the length of the strip. Discontinuity 12 is preferably formed as a strictured recess having opening 13 along the surface of the strip narrow relative to the width of the recessed pocket 14 formed adjacent to the surface of the strip.

At this point, weatherstripping 18 of pile, vinyl, rubber, felt or felt-like material made of natural or synthetic fibers, or flexible metal is continuously inserted into recess 14 as the recess is formed. The strictured opening 13 is then tightened through successive rolls so as to secure weatherstripping 18 in place. Weatherstripping 18 may be additionally secured by use of a suitable bonding compound.

Next the successive forming rolls begin rolling over edges 16 and 17 of the strip until the edges are turned at right angles to the plane of the strip.

Further forming rolls produce a second discontinuity 11 spaced to the other side of center relative to said first discontinuity 12 along the length of the strip. Discontinuity 11 may take the form of a depressed groove such as that depicted in FIG. 1.

A glass gripping gasket made of a resilient material such as rubber or vinyl, is molded, extruded or otherwise shaped in ribbons that when placed in juxtaposed pairs form a U-shaped channel similar to the U-shaped channel made of a unitary piece in prior art framing.

It has been found convenient to make this gasket in a single continuous double-width extruded ribbon. Preferably this ribbon has a series of ridges and grooves lengthwise along one surface for better gripping and sealing of the edges of a pane of glass. In another embodiment the extruded ribbon gasket may have the series of ridges and grooves on the opposite side so that they will face the sides of the metal channel as depicted in FIG. 4. It is also contemplated that ridges and grooves may be extruded or otherwise formed in both sides of the ribbon gasket.

In each of these arrangements the ridges and grooves serve the purpose of providing a better seal as well as increased compliancy for facilitating the insertion of a glass pane or other panel.

In extruding the ridges and grooves in the ribbon gasket it has been found desirable although not essential to provide two relatively massive ridges extending adjacent to each other down the center of the double-width ribbon. The double-width ribbon is slit between the two massive ridges into two ribbons as it is fed into the roll forming machine.

First ribbon 20 of gasket material is guided along the framing strip with the edge 21 of the former lying under rolled edge 16 of the latter. Second ribbon 22 of gasket material is placed along the strip with edge 23 of the former lying under edge 17 of the latter. Edges 16 and 17 are then curled around further by means of successive forming rolls so as to pinch gasket strips 20 and 22 securely to the frame member.

In the preferred arrangement of FIG. 1 the ribbons 20 and 22 of gasket material have their ridged sides facing inward toward each other. It has been found that this provides the greatest facilitation for glass insertion. FIG. 4 depicts the ridged surfaces of ribbons 20 and 22 facing outward for contact against the metal surfaces of the frame member. In either case massive ridges such as depicted at the lower edges of ribobns 20 and 22 in FIG. 4 will provide additional support for the edge of an inserted pane or panel. It has been found additionally desirable, although not essential, that the width of ribbons 20 and 22 be such that upon insertion in the frame member, their lower edges rest on the discontinuities 11 and 12 so that additional support for the gasket is obtained from these discontinuities.

A final sequence of roll forming operations bends the flat framing strip 10 into its final U-shaped channel configuration bringing the two gasket ribbons into juxtaposition so as to form a second U-shaped channel for receiving a sheet of glass. The relatively massive ridges along one juxtaposed edge of each ribbon mates with its counterpart to form the closed portion of the U. The framing member is then cut on the fly to either long (18 ft.) mill lengths, or to short (2–5 ft.) finished lengths.

The only remaining operations for producing a completely framed glass panel are miter cutting the frame members to the required lengths to fit the glass panes in question and assembling them together with reinforcing corners to the pane of glass. Miter cutting as depicted at 25, FIG. 3, can be a separate operation performed on long mill lengths of framing, or it can be done on the fly in conjunction with roll forming to provide a considerable saving. Each corner reinforcement 30 is comprised of two arms 31 and 32, one of which slides into the end of a mitered frame member U channel where it is constrained by the groove 11 and the interior faces of the channel sides and bottom where it is secured by friction and/or pressed dimples, screws, or the like. Assembly of the glass panel is accomplished by first slipping one mitered frame member over the glass 28, then inserting one arm of a corner reinforcement into each end of that frame member, then inserting other frame members over the other arms of the corner reinforcements and over the glass until 3 sides of the glass are framed. Corner reinforcements are then slipped into each end of the 4th framing member to make a sub-assembly which in turn is then slipped into adjacent framing members and over the glass. The final operation is stamping the dimples or emplacing screws into the corner reinforcements.

Thus a window frame member of the type described herein using a split window gasket is especially suited for mass production of window panels with the gaskets and weather-stripping in place. All the tools required for the panel assembly are those normally available in a window or door factory. The time required to assemble the gasket and weatherstrip at the time of manufacture of the framing member is insignificant compared with the time required for the window manufacturer to do so. Metal finish, such as paint or anodize, can readily be prefinished and a further saving is possible in that thinner gages of metal can be roll formed than can be extruded.

An additional advantage of the present invention is provided by discontinuities 11 and 12 formed in the frame member. These discontinuities provide additional longitudinal stiffness and improved alignment with the corner reinforcements 30.

While the invention has been described with respect to a specific embodiment, it has applications for all manner of glass, plastic and other panel framing, notably for lighting fixtures. Accordingly it is the intention to cover the invention broadly within the spirit and scope of the appended claims.

What is claimed is:

1. A process for roll forming a U-channel framing member for panels while simultaneously securing gasket material thereto comprising passing a flat strip of formable metal through a sequence of matched pairs of contoured rollers which are successively contoured so as to:
   (a) form a discontinuity spaced to one side of center along said strip;
   (b) roll over the edges of said strip;
   (c) pinch the edges of said strip each over a separate ribbon of gasket material; and
   (d) bend up the sides of said strip to form said U-channel.

2. A process for roll forming according to claim 1 which comprises feeding two ribbons of compliant ridged gasket material one under each of the edges of said strip before they are pinched whereby when the edges of said strip are pinched, one ribbon of gasket material is secured to each edge and said two ribbons are juxtaposed to form a gasket for receiving a pane of glass when the sides of said strip are bent to form a U-channel.

3. A process for roll forming according to claim 2 in which said discontinuity is a strictured recess and weather-stripping is fed into said recess followed by additional stricturing by a set of said contoured rollers whereby said weatherstripping is secured to said framing member.

4. A process for roll forming according to claim 3 in which a second discontinuity in the form of a groove is roll formed into said strip spaced on the other side of center relative to said recess and juxtaposed with said recess by the bending of the sides of said strip whereby said second discontinuity and said recess serve to constrain the positioning of corner reinforcements when pieces of said framing members are joined to frame a pane of glass.

5. A proces for roll-forming according to claim 4 in which said steps are performed continuously in a single machine fed by a strip of flat metal weatherstripping, and a ribbon of compliant gasket material.

References Cited

UNITED STATES PATENTS

| 2,041,004 | 5/1936 | Levan | 29—505 |
| 2,056,675 | 10/1936 | Kellogg | 29—509 |
| 3,204,324 | 9/1965 | Nilsen | 29—155 |
| 3,441,995 | 5/1969 | Revell et al. | 29—155 |

THOMAS H. EAGER, Primary Examiner

U.S. Cl. X.R.

29—509